US008000705B2

(12) United States Patent
Kim et al.

(10) Patent No.: US 8,000,705 B2
(45) Date of Patent: Aug. 16, 2011

(54) APPARATUS AND METHOD FOR CONNECTING CALL IN MOBILE TERMINAL

(75) Inventors: Noh-Sun Kim, Suwon-si (KR); Yong-Suk Moon, Seongnam-si (KR); Yu-Shin Kim, Osan-si (KR)

(73) Assignee: Samsung Electronics Co., Ltd (KR)

( * ) Notice: Subject to any disclaimer, the term of this patent is extended or adjusted under 35 U.S.C. 154(b) by 948 days.

(21) Appl. No.: 11/698,307

(22) Filed: Jan. 25, 2007

(65) Prior Publication Data

US 2007/0191010 A1   Aug. 16, 2007

(30) Foreign Application Priority Data

Jan. 26, 2006 (KR) .................. 10-2006-0008384

(51) Int. Cl.
*H04W 4/00* (2009.01)
(52) U.S. Cl. ............... 455/435.1; 455/435.2; 455/435.3; 455/436; 455/516; 455/525
(58) Field of Classification Search ............... 455/435.1, 455/435.2, 435.3, 436–453, 516, 525
See application file for complete search history.

(56) References Cited

U.S. PATENT DOCUMENTS

| | | | |
|---|---|---|---|
| 2004/0224709 A1* | 11/2004 | Yi et al. ................ | 455/515 |
| 2004/0229629 A1* | 11/2004 | Yi et al. ................ | 455/452.2 |
| 2004/0264421 A1 | 12/2004 | Sato et al. | |
| 2005/0090224 A1* | 4/2005 | Dorsey et al. ......... | 455/404.1 |

FOREIGN PATENT DOCUMENTS

| | | |
|---|---|---|
| EP | 1 509 056 A2 | 2/2005 |
| JP | 1996-182036 | 7/1996 |
| JP | 2000138627 | 5/2000 |
| KR | 1020010064592 | 7/2001 |
| KR | 10-2006-0004727 | 1/2006 |
| KR | 1020060004727 * | 1/2006 |
| WO | WO 01/54442 A1 | 7/2001 |

OTHER PUBLICATIONS

Tektronix: Exploit KIP Measurements for UTRAN Optimization (Online) 2005, pp. 1-12.
3GPP2: Direct Spread Specification for Spread Spectrum Systems on ANSI-41 (DS-41) (Upper Layers Air Interface), Jun. 9, 2000, p. 1-10.

* cited by examiner

*Primary Examiner* — Jinsong Hu
*Assistant Examiner* — Dung Hong
(74) *Attorney, Agent, or Firm* — The Farrell Law Firm, P.C.

(57) ABSTRACT

Provided is an apparatus and method for preventing successive failures in a call connection in a mobile communication terminal. When a call connection is attempted, a cell with the highest RX power is selected among cells and an RRC Connection Request message is transmitted from the mobile terminal to a BS of the selected cell. It is determined whether the mobile terminal receives an RRC Connection Accept/Reject message from the BS. If the mobile terminal receives an RRC Connection Reject message from the BS of the selected cell, it is determined whether the selected cell is able to perform the RRC connection by detecting a Connection Reject message frequency that is the number of times of rejection of an RRC connection request for a predetermined period. If the selected cell is not able to perform the RRC connection, a neighboring cell is reselected and an RRC Connection Request message is transmitted to the reselected neighboring cell.

8 Claims, 5 Drawing Sheets

APPARATUS AND METHOD FOR CONNECTING CALL IN MOBILE TERMINAL

PRIORITY

This application claims priority under 35 U.S.C. §119 to an application filed in the Korean Intellectual Property Office on Jan. 26, 2006 and assigned Serial No. 2006-8384, the contents of which are incorporated herein by reference.

BACKGROUND OF THE INVENTION

1. Field of the Invention

The present invention relates generally to an apparatus and method for preventing successive failures in a call connection in a mobile terminal, and in particular, to an apparatus and method for making a call connection request from a mobile terminal to another Base Station (BS) when a call connection request from the mobile terminal to a BS is rejected more than a predetermined number of times.

2. Description of the Related Art

In a Universal Mobile Telecommunications System (UMTS), a Radio Resource Control (RRC) connection between a User Equipment (UE) and a UMTS Terrestrial Radio Access Network (UTRAN) is first performed to establish a call connection. The UTRAN includes a BS and a BS controller.

In order to connect a call, the UE selects a cell with the highest RX (receive) power among cells from which the UE receives signals. Thereafter, the UE transmits an RRC Connection Request message to a UTRAN of the selected cell over a Random Access CHannel (RACH) that is an uplink access channel. The RRC Connection Request message includes Message Type, Initial UE Identifier, Establishment Cause, Protocol Error Indicator, and Measurement Results on RACH.

Upon receipt of the RRC Connection Request message, the UTRAN detects its network condition, and transmits, depending on the detected network condition, an RRC Connection Accept message or an RRC Connection Reject message to the UE over a Forward Access CHannel (FACH) that is a downlink channel.

If the detected network condition is suitable for performing the RRC connection, the RRC connection between the UE and the UTRAN is performed as illustrated in FIG. 1.

Referring to FIG. 1, in order to connect a call, a UE 100 selects a cell with the highest RX power among cells from which the UE 100 receives signals, and transmits an RRC Connection Request message to a UTRAN 102 of the selected cell in step 110.

Upon receipt of the RRC Connection Request message, UTRAN 102 detects that its network condition is suitable for performing the RRC connection, and transmits an RRC Connection Accept message to the UE 100 in step 112.

Upon receipt of the RRC Connection Accept message, the UE 100 performs an RRC connection with the UTRAN and transmits an RRC Connection Complete message to the UTRAN 102 in step 114.

On the other hand, when the detected network condition is unsuitable for performing the RRC connection, the RRC connection between the UE and the UTRAN is performed as illustrated in FIG. 2.

Referring to FIG. 2, in order to connect a call, a UE 200 selects a cell with the highest RX power among cells from which the UE 200 receives signals, and transmits an RRC Connection Request message to a UTRAN 202 of the selected cell in step 210.

Upon receipt of the RRC Connection Request message, the UTRAN 202 detects that its network condition is unsuitable for performing the RRC connection, and transmits an RRC Connection Reject message to the UE 200 in step 212. The RRC Connection Reject message includes Message Type, RRC Transaction Identifier, Initial UE Identifier, Rejection Cause, Wait Time, and Call Redirection Information so that the UE 200 can know why the RRC connection is rejected.

Upon receipt of the RRC Connection Reject message, the UE 200 detects the Message type and the Rejection Cause, which are contained in the RRC Connection Reject message, to determine that the RRC connection with UTRAN 202 has failed, and then changes into an idle state.

As described above, when the network condition of the UTRAN is suitable for the RRC connection, the UE and the UTRAN can perform the RRC connection to establish the call connection. On the other hand, when the UTRAN cannot perform the RRC connection due to network problems such as congestion, the UE cannot establish the call connection with the UTRAN.

However, the UE cannot know the fact that the UTRAN cannot perform the RRC connection due to the network problems. Accordingly, whenever a user of the UE attempts to connect a call, the UE transmits the RRC Connection Request message to the UTRAN of the selected cell. In this case, the user cannot connect or receive a call due to the network problems, but not due to the problems of the UE.

SUMMARY OF THE INVENTION

An object of the present invention is to substantially solve at least the above problems and/or disadvantages and to provide at least the advantages below. Accordingly, an object of the present invention is to provide an apparatus and method for preventing successive failures in a call connection in a mobile terminal.

Another object of the present invention is to provide an apparatus and method for making an RRC connection request from a mobile terminal to another BS of another cell when an RRC connection request from the mobile terminal to a BS is rejected more than a predetermined number of times.

According to one aspect of the present invention, there is provided a method for preventing successive failures in a call connection in a mobile terminal, the method includes selecting a cell with the highest RX power among cells and transmitting an RRC Connection Request message from the mobile terminal to a BS of the selected cell when a call connection is attempted; determining whether the mobile terminal receives an RRC Connection Accept/Reject message from the BS; if the mobile terminal receives an RRC Connection Reject message from the BS of the selected cell, determining whether the selected cell is able to perform the RRC connection by detecting a Connection Reject message frequency that is the number of times of rejection of an RRC connection request for a predetermined time; and if the selected cell is not able to perform the RRC connection, reselecting a neighboring cell and transmitting an RRC Connection Request message to the reselected neighboring cell.

According to another aspect of the present invention, there is provided an apparatus for preventing successive failures in a call connection in a mobile terminal, the apparatus includes a controller for determining, when an RRC Connection Reject message is received from a first BS of a cell, whether the first BS is able to perform an RRC connection, and reselecting a second BS of a neighboring cell if the first BS is not able to perform the RRC connection; and a communication module for transmitting an RRC Connection Request message to the second BS.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail because they would obscure the present invention in unnecessary detail.

The present invention provides an apparatus and method for preventing successive failures in a call connection using the number of times of rejection of an RRC connection requested by a mobile terminal. In the following description, a Mobile Originated (MO) call is used for illustration purposes. However, the present invention can also be applied to a Mobile Terminated (MT) call. The MO call corresponds to a case where a user of a mobile terminal attempts to connect a call to another mobile terminal, while the MT call corresponds to a case where a mobile terminal receives a call connection request from another mobile terminal.

In addition, the following description can be applied to any case where the RRC connection is rejected, regardless of the reasons for the rejection.

Figure 1:
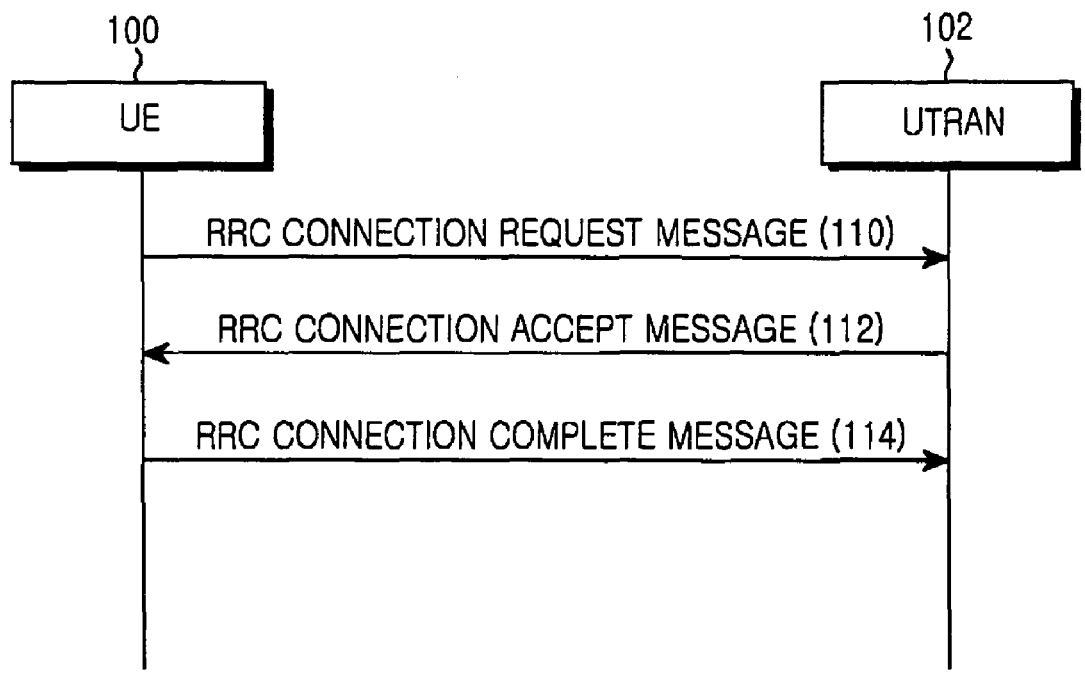
FIG. 1 is a diagram illustrating a conventional Call Connection Complete procedure in a mobile terminal.
Figure 2:
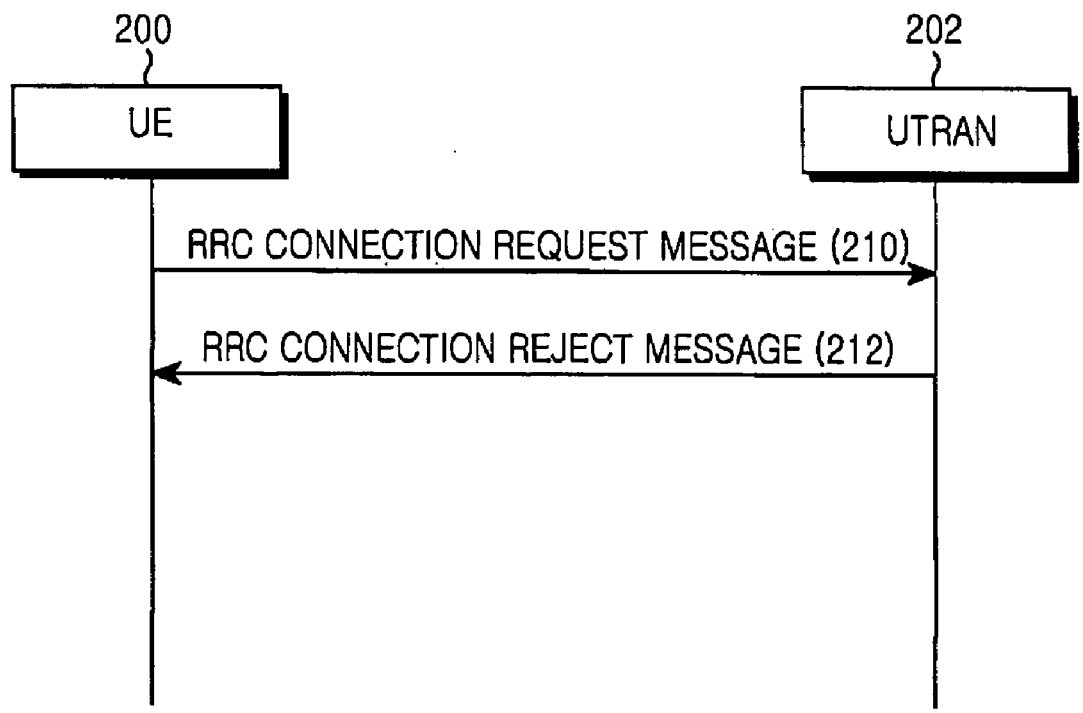
FIG. 2 is a diagram illustrating a conventional Call Connection Failure procedure in a mobile terminal.
Figure 3:
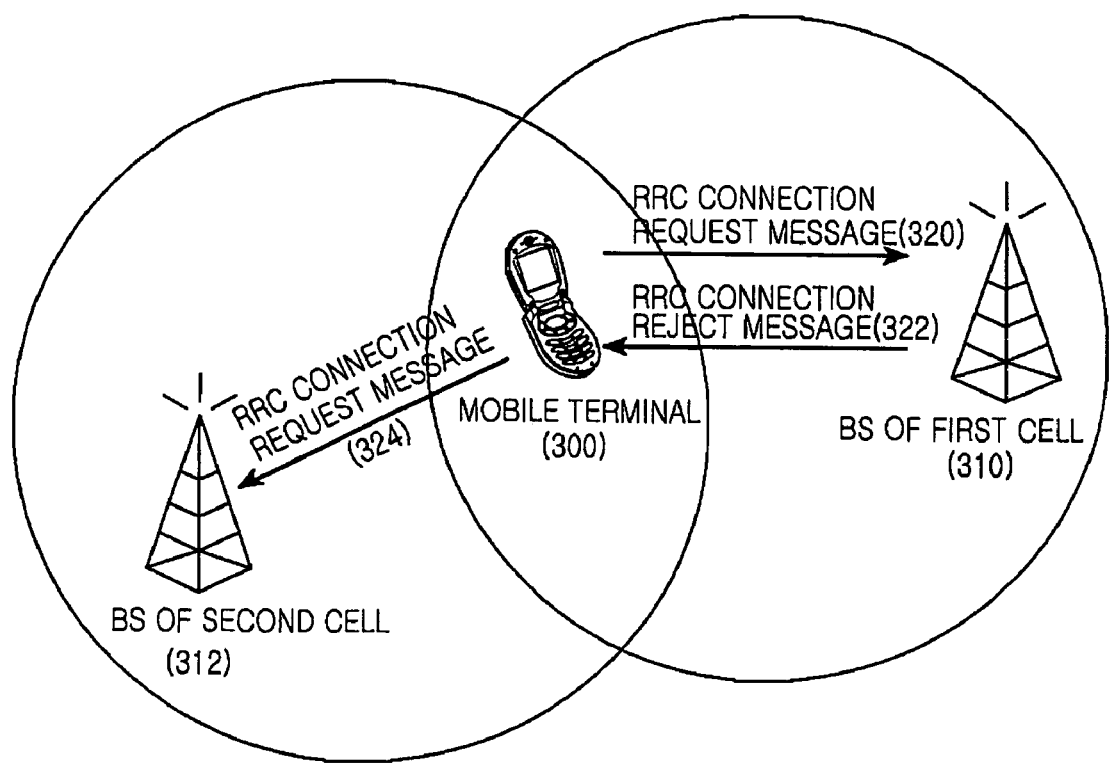
FIG. 3 is a diagram illustrating a mobile communication system for preventing successive failures in a call connection in a mobile terminal according to the present invention.

Referring to FIG. 3, when a user of a mobile terminal 300 attempts to connect a call, the mobile terminal 300 selects a first cell with the highest RX power among cells from which the mobile terminal 300 receives signals in order to establish a call connection. In step 320, the mobile terminal 300 transmits an RRC Connection Request message to a BS 310 of the first cell over an RACH.

Upon receipt of the RRC Connection Request message, the BS 310 detects its network condition to determine whether to accept the RRC connection request, and transmits an RRC Connection Accept message or an RRC Connection Reject message to the mobile terminal 300 over an FACH.

The following description is made of an exemplary case where the BS 310 determines that it cannot perform an RRC connection with the mobile terminal 300 due to network problems such as congestion. In step 322, the BS 310 transmits an RRC Connection Reject message to the mobile terminal 300.

The mobile terminal 300 records for a predetermined period the number of times the RRC Connection Reject message is received. Hereinafter, this event will be simply referred to as "the Connection Reject message frequency". The mobile terminal 300 compares the Connection Reject message frequency with a predetermined maximum rejection frequency to determine whether the BS 310 is in a condition to be able to perform the RRC connection. The predetermined maximum rejection frequency is a reference value for determining whether the BS 310 is able to perform the RRC connection. The predetermined maximum rejection frequency is set to prevent the RRC connection request from being rejected more than a predetermined number of times for a predetermined time.

If the Connection Reject message frequency is larger than the predetermined maximum rejection frequency, the mobile terminal 300 determines that the BS 310 is not able to perform the RRC connection, and selects a second cell with the highest RX power among the remaining cells except the first cell. In step 324, the mobile terminal transmits an RRC Connection Request message to a BS 312 of the second cell.

On the other hand, if the Connection Reject message frequency is less than or equal to the predetermined maximum rejection frequency, the mobile terminal 300 determines that the RRC connection has failed and then changes to an idle state. Thereafter, when the user again attempts to connect a call, the mobile terminal 300 again transmits an RRC Connection Request message to the BS 310 of the first cell (step 320).

If the BS 310 accepts the RRC connection request of the mobile terminal 300, the mobile terminal 300 and the BS 310 can perform the RRC connection to establish a call connection.

Figure 4:
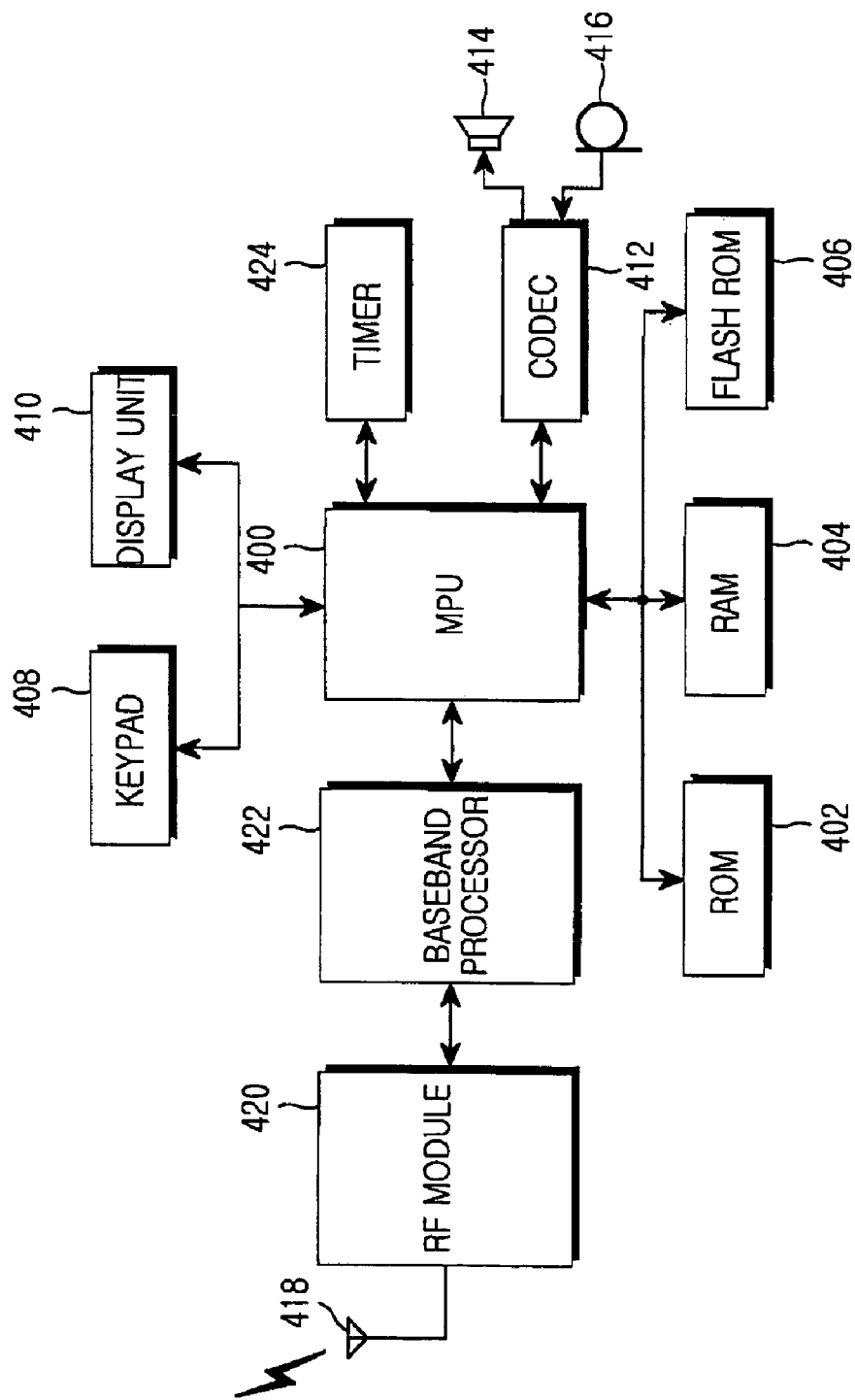
FIG. 4 is a block diagram of a mobile terminal according to the present invention.

Referring to FIG. 4, the mobile terminal includes a Controller (e.g., a microprocessor unit (MPU)) 400, a read only memory (ROM) 402, a random access memory (RAM) 404, a flash ROM 406, a keypad 408, a display unit 410, a coder-decoder (CODEC) 412, a speaker 414, a microphone 416, an antenna 418, a radio-frequency (RF) module 420, a baseband processor 422, and a timer 424.

The controller 400 controls overall operation of the mobile terminal. For example, the controller 400 processes and controls voice communication and data communication. In addition to the general functions, the controller 400 performs a function for preventing successive failures in a call connection using the number of times of rejection of an RRC connection request for a predetermined time. A detailed description about the general control operation of the controller 400 will be omitted for conciseness.

The ROM 402 stores a variety of reference data and microcodes of a program for the process and control operation of the controller 400. According to the present invention, the ROM 402 stores a program for detecting the number of times of rejection of an RRC connection request for a predetermined time, a program for determining whether a selected cell is in a condition to be able to perform an RRC connection, a program for managing cells that use different Radio Access Technologies (RATs), and a program for transmitting an RRC Connection Request message to another cell when the selected cell is not able to perform the RRC connection The RAM 404 is a working memory of the controller 400, which stores temporary data that are generated during the execution of various programs. According to the present invention, the RAM 404 stores the Connection Reject message frequency that is the number of times of receipt of the RRC Connection Reject message for a predetermined time.

The Flash ROM 406 stores a variety of updatable data such as a phone book, an outgoing message, and an incoming message. According to the present invention, the Flash ROM 406 stores the list of cells from which the mobile terminal receives signals. The Flash ROM 406 also stores the predetermined maximum rejection frequency that is a reference value for determining whether a selected BS is able to perform the RRC connection. The predetermined maximum rejection frequency is set to prevent the RRC connection request from being rejected more than a predetermined number of times for the predetermined period.

The timer 424 is used to measure time. According to the present invention, the timer 424 starts to operate under the control of the controller 400 when the mobile terminal receives a first RRC Connection Reject message from a selected BS, and stops its operation and is initialized when the number of received RRC Connection Reject messages reaches the predetermined maximum rejection frequency.

The keypad 408 includes numeric keys of digits 0-9 and a plurality of function keys, such as a Menu key, a Cancel (delete) key, a Confirmation key, a Talk key, an End key, an Internet connection key, Navigation keys (▲/▼/◀/▶), and a character input key. The keypad 408 provides the controller 400 with key input data that corresponds to a key pressed by a user.

The display unit 410 displays status information generated during an operation of the mobile terminal, numerals and characters, moving pictures and still pictures, and so on. The display unit 410 may be a color Liquid Crystal Display (LCD).

The CODEC 412 is connected to the controller 400, and the speaker 414 and the microphone 416 are connected to the CODEC 412. The CODEC 412, the speaker 414 and the microphone 416 serve as a voice input/output block for a telephone communication and voice recording. The CODEC 412 converts pulse code modulation (PCM) data received from the controller 400 into analog voice signals to output the analog voice signals to the speaker 414, and converts voice signals received from the microphone 416 into PCM data to provide the PCM data to the controller 400.

The RF module 420 down-converts an RF signal received through the antenna 118 to provide the resulting baseband signal to a baseband processor 422, and up-converts a baseband signal provided from the baseband processor 422 to transmit the resulting RF signal through the antenna 418. The baseband processor 422 processes the baseband signals that are exchanged between the RF module 420 and the controller 400. For example, the baseband processor 422 channel-codes and spreads data to be transmitted, and despreads and channel-decodes a received data.

Figure 5:
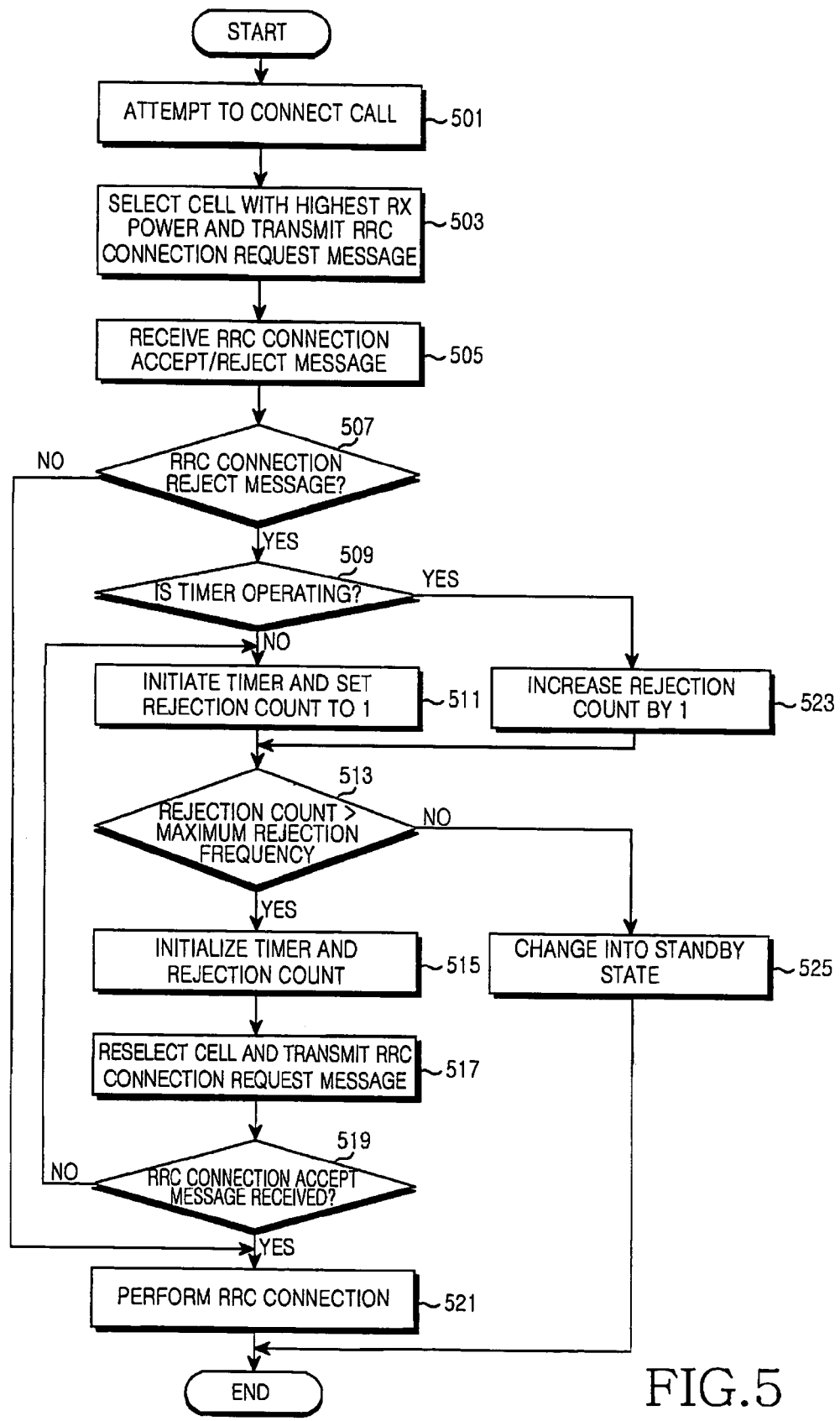
FIG. 5 is a flowchart illustrating a procedure for preventing successive failures in a call connection in a mobile terminal according to the present invention.

Referring to FIG. 5, when a user of the mobile terminal attempts to connect a call in step 501, the controller 400 selects a cell with the highest RX power among cells from which the mobile terminal receives signals in order to establish a call connection, and transmits an RRC Connection Request message to a selected BS of the selected cell in step 503.

In step 505, the controller 400 determines if the mobile terminal receives an RRC Connection Accept/Reject message from the selected BS. If so, the procedure advances to step 507.

In step 507, the controller 400 determines if the RRC Connection Accept/Reject message is an RRC Connection Reject message. If so, the procedure advances to step 509; and if not, the procedure advances to step 521. In step 521, the controller 400 performs an RRC connection with the BS. Thereafter, the controller 400 ends the procedure.

In step 509, the controller 400 determines if the timer 424 is operating. If so, the procedure sequentially advances to step 523 and step 513; and if not, the procedure sequentially advances to step 511 and step 513. The timer 424 is used to measure the number of RRC Connection Reject messages that are received at the mobile terminal for a predetermined period.

In step 511, the controller 400 initiates an operation of the timer 424 and sets a rejection count for indicating the number of received RRC Connection Reject messages to "1".

In step 523, the controller 400 increases the rejection count by "1".

In step 513, using the timer 424 and the rejection count, the controller 400 detects the Connection Reject message frequency, i.e., the number of times of receipt of the RRC Connection Reject message for a predetermined period, and compares the Connection Reject message frequency with a predetermined maximum rejection frequency to determine whether the selected BS is able to perform the RRC connection. The predetermined maximum rejection frequency is a reference value for determining whether the selected BS is able to perform the RRC connection. The predetermined maximum rejection frequency is set to prevent the RRC connection request from being rejected more than a predetermined number of times for a predetermined period. If the Connection Reject message frequency is larger than the predetermined maximum rejection frequency, the procedure advances to step 515; and if not, the procedure advances to step 525.

In step 525, the controller 400 determines that the selected BS is able to perform the RRC connection even though the selected BS has rejected the RRC connection request, and changes the mobile terminal into an idle state. Thereafter, the controller 400 ends the procedure.

For example, assume that the predetermined maximum rejection frequency is set to 5 and the mobile terminal receives the RRC Connection Reject message four times for the predetermined period. In this case, because the Connection Reject message frequency is smaller than the predetermined maximum rejection frequency, the controller 400 determines that the selected BS is able to perform the RRC connection.

In step 515, the controller 400 determines that the selected BS is not able to perform the RRC connection, and initializes the timer 424 and the rejection count for the RRC connection with the selected BS.

For example, assume that the predetermined maximum rejection frequency is set to 5 and the mobile terminal receives the RRC Connection Reject message six times for the predetermined period. In this case, because the Connection Reject message frequency is greater than the predetermined maximum rejection frequency, the controller 400 determines that the selected BS is not able to perform the RRC connection.

In step 517, the controller 400 reselects a cell with the highest RX power among the remaining cells except the selected cell, and transmits an RRC Connection Request message to a reselected BS of the reselected cell.

In step 519, the controller 400 determines if the mobile terminal receives an RRC Connection Accept message from the reselected BS. If so, the procedure advances to step 521; and if not, the procedure returns to step 511.

In step 521, the controller 400 performs an RRC connection with the reselected BS. Thereafter, the controller 400 ends the procedure.

As described above, if the selected cell is not able to perform the RRC connection, the RRC Connection Request message is transmitted to the reselected cell. Accordingly, it is possible to increase the success rate of the call connection, to reduce the uplink interference, and to avoid the unnecessary access attempts. Consequently, it is possible to extend the battery life of the mobile terminal.

While the present invention has been shown and described with reference to certain preferred embodiments thereof, it will be understood by those skilled in the art that various changes in form and details may be made therein without departing from the spirit and scope of the present invention as further defined by the appended claims.

What is claimed is:

1. A method for preventing successive failures in a call connection in a mobile terminal, the method comprising the steps of:
    selecting a cell with a highest reception power among cells and transmitting a Radio Resource Control (RRC) Connection Request message to a base station (BS) of the selected cell when a call connection is attempted;
    determining whether the mobile terminal receives an RRC Connection Reject message from the BS;
    updating a recorded number of RRC Connection Reject messages received during a current predetermined period and comparing the recorded number with a predetermined maximum rejection frequency, when the mobile terminal receives the RRC Connection Reject message from the BS of the selected cell;
    reselecting a neighboring cell and transmitting an RRC Connection Request message to the reselected neighboring cell, when the recorded number is greater than the predetermined maximum rejection frequency; and
    changing the mobile terminal to an idle state, when the recorded number is less than or equal to the predetermined maximum rejection frequency.

2. The method of claim 1, wherein
    the selected cell is not able to perform the RRC connection when the Connection Reject message frequency is greater than the predetermined maximum rejection frequency.

3. The method of claims 1, wherein the selected cell is able to perform the RRC connection, when the Connection Reject message frequency is less than or equal to the predetermined maximum rejection frequency.

4. The method of claim 1, wherein the predetermined maximum rejection frequency is a reference value that is set to prevent the RRC connection request from being rejected more than a predetermined number of times for the predetermined period.

5. The method of claim 1, wherein the step of reselecting the neighboring cell and transmitting the RRC Connection Request message to the reselected neighboring cell comprises:
    measuring the RX power strengths of the remaining cells except the selected cell; and
    transmitting an RRC Connection Request message to a cell with the highest RX power among the remaining cells except the selected cell.

6. The method of claim 1, further comprising, if the mobile terminal receives an RRC Connection Accept message from the BS of the selected cell, performing the RRC connection between the mobile terminal and the BS of the selected cell to establish the call connection.

7. A mobile communication terminal for preventing successive failures in a call connection comprising:
    a controller for updating a recorded number of Radio Resource Control (RRC) Connection Reject messages received during a current predetermined period and comparing the recorded number with a predetermined maximum rejection frequency when the mobile terminal receives an RRC Connection Reject message from a Base Station (BS) of a selected cell, reselecting a neighboring cell and transmitting an RRC Connection Request message to the reselected neighboring cell when the recorded number is greater than the predetermined maximum rejection frequency, and changing the mobile terminal to an idle state when the recorded number is less than or equal to the predetermined maximum rejection frequency; and
    a communication module for transmitting an RRC Connection Request message;
    wherein reselecting the neighboring cell comprises selecting a cell with highest reception power among remaining cells except the cell from which the RRC Connection Reject message is received.

8. The mobile communication terminal of claim 7, wherein the predetermined maximum rejection frequency is a reference value that is set to prevent the RRC Connection Request message from being rejected more than a predetermined number of times for the predetermined period.

* * * * *